W. W. DUTCHER.

ROLLER-TEMPLES FOR LOOMS.

No. 6,930. Reissued Feb. 15, 1876.

Witnesses.

L. H. Latimer.

W. G. Prath

Inventor.

Geo Draper

President of the Dutcher Temple Co

Assignee Warren W. Dutcher per Lemuel Gregory

Attys.

UNITED STATES PATENT OFFICE.

WARREN WHITNEY DUTCHER, OF HOPEDALE, MASSACHUSETTS, ASSIGNOR, BY MESNE ASSIGNMENTS, TO THE DUTCHER TEMPLE COMPANY.

IMPROVEMENT IN ROLLER-TEMPLES FOR LOOMS.

Specification forming part of Letters Patent No. 37,954, dated March 24, 1863; reissue No. 6,930, dated February 15, 1876; application filed February 7, 1876.

*To all whom it may concern:*

Be it known that I, WARREN WHITNEY DUTCHER, of Hopedale, in the county of Worcester and State of Massachusetts, have made a new and useful invention, having reference to Roller-Temples for Weaving-Looms, of which the following specification, in connection with the accompanying drawings, is a full description.

Figure 1:
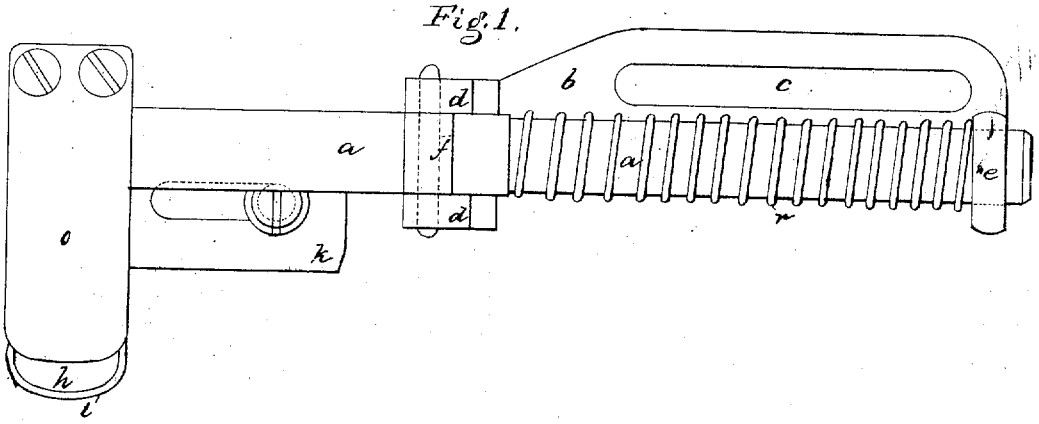
Figure 2:
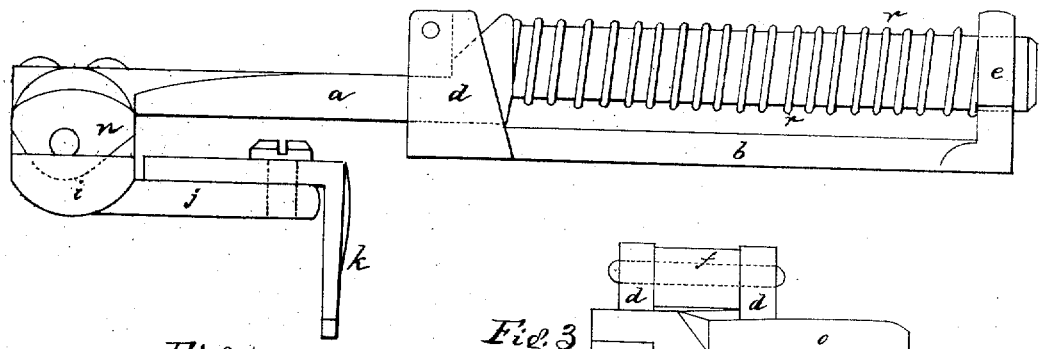
Figure 3:
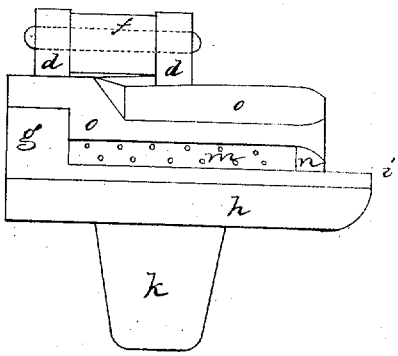
Figure 4:
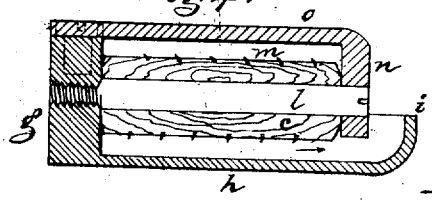
Figure 5:
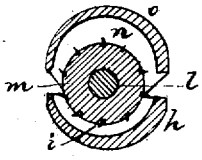

Figure 1 is a top view, Fig. 2 a side elevation, and Fig. 3 a front end view, of a temple provided with this invention. Fig. 4 is a transverse section taken in the line of and through the axis of the toothed roller of the said temple, and Fig. 5 is a section taken perpendicularly to the axis of said roller.

This invention relates to roller-temples in which the toothed roller is carried by a bar or stock adapted to be struck and moved by the lay, the temple-roller moving a distance corresponding with, and substantially equal to, the movement of the cloth as beaten forward by the reed, so as to grasp the selvages as close to the cloth-making point and reed as possible, in order to retain the cloth distended; and the invention consists in the combination, with such a reciprocating temple bar or stock, and its trough and roller, of a cap and end piece adapted to support the end of the temple-roller against lateral strain exerted by the cloth. Also, in a trough provided with a raised lip or closed inner end to support the cloth outside the end of the roller, in combination with a toothed roller and a cap or cover, and its end piece.

The temple-bar *a* is supported in a stand, *b*, slotted at *c* to attach the stand adjustably to the breast-beam of the loom, and between the guide-posts or ears *d e* is placed a strong spiral spring, *r*, to keep the temple-bar pressed forward against the front stop *f*. At the front of the bar is a lug, *g*, and a trough, *h*, provided at its forward end with a lip or closed end, *i*, to support the cloth immediately in line with and beyond the end of the roller, to prevent forming a curve in the cloth between opposite temples, as desc bed in United States Patent No. 28,043, to which reference may be had.

A projection, *j*, also connected with the forward end of the bar, has adjustably connected with it a heel, *k*, adapted to be struck by the lay so as to move the temple-bar and its roller back toward the breast-beam a distance substantially equal to the distance the cloth is moved back by the blow of the reed on the the last pick of weft.

The pin or journal *l* for supporting the temple-roller *m*, provided with cloth-engaging pins, is supported at one end on lug *g*, and at its other end is engaged by an end piece or extension, *n*, placed at the inner end of the cap *o*, made detachable from the bar or its lug *g*, and this end piece supports the end of the temple-roller against lateral strain exerted on the roller by the action of the cloth, the strain on the roller tending to move it in the direction of the arrow.

It will also be noticed that the end piece prevents the end of the roller or its journal from being struck and split or injured by a shuttle deflected from its true course in the operation of the loom, and in case a shuttle is lodged between the reed and front of the temple, the temple-bar slides back, and prevents injury of such reed or shuttle.

The cap *o* is detachable to remove the roller from the trough, and the cap and trough, as constructed, nearly cover the roller, and sufficiently so as to prevent the shuttle or its point from injuring the small pins set in the wooden roller. The lip or closed e d *i* in a measure guards the end of the roller, but with the end piece *n* the end of the roller is effectually protected.

An independently-acting temple is placed at each selvage, and each is operated synchronously so long as the weaving operation goes on regularly; but if the shuttle is deflected from its regular course, and caught between the temple and lay, then such temple, disconnected from the other temple, is permitted to yield without disturbing the position of the other temple at the other selvage.

I claim—

1. In a loom-temple, adapted to move with and under the action of the lay, substantially as described, a trough, a toothed roller, a cap, and an end piece adapted to support the end of the roller against lateral strain exerted by the cloth.

2. A trough provided with a lip or closed end, in combination with a roller and a cap, and an end piece, to operate substantially as described.

WARREN WHITNEY DUTCHER.

Witnesses:
EBEN O. BANCROFT,
FRANK J. DUTCHER.